Patented Feb. 28, 1950

2,499,283

UNITED STATES PATENT OFFICE 2,499,283

INHIBITED HYDROCHLORIC ACID

Harold A. Robinson, Midland, Mich., assignor to The Dow Chemical Company, Midland, Mich., a corporation of Delaware No Drawing. Application January 26, 1948,
Serial No. 4,469

4 Claims. (Cl. 252—148)

The invention relates to aqueous hydrochloric acid solution, the corrosiveness of which to ferrous metals has been inhibited. It more particularly concerns an improved inhibited hydrochloric acid composition particularly suitable for use in descaling ferrous metal.

It is oftentimes necessary to remove scale and like acid-soluble deposits which form upon the surface of iron and steel as a result of various events such as atmospheric attack due to weathering, high temperature oxidation as when the metals are heat treated in an oxidizing atmosphere, and scaling due to contact with water containing scale forming constituents, or otherwise. One of the well-known methods of treatment for the removal of the scale and like deposits consists of a protracted immersion in aqueous hydrochloric acid to which has been added one of the known inhibitors of corrosion of ferrous metal by the acid. Typical of such inhibitors are certain organic bases containing nitrogen rings in their molecule, such as acridine, pyridine, quinoline, and homologues of these substances. These materials function to reduce the corrosiveness of the acid upon the ferrous metal without reducing the ability of the acid to attack and dissolve acid-soluble scale-forming constituents.

A disadvantage of such inhibited acid solutions is that when the scale contains a ferric iron constituent soluble in the acid the acid solution becomes additionally corrosive in spite of the presence of the organic nitrogen-base inhibitor, allowing the underlying metal to be attacked to an extent corresponding stoichiometrically to the ferric iron content dissolved from the scale. This behavior of the acid becomes apparent when a sample of iron or steel, bearing scale containing a ferric iron constituent (e. g. $Fe_3O_4$), is treated in aqueous hydrochloric acid inhibited with the usual organic nitrogen-base inhibitors aforementioned. In such treatments, it is always observed that the dissolved ferric iron constituent of the scale is reduced to the ferrous state in the spent acid, the reduction occurring apparently at the expense of the underlying metallic iron which is dissolved from the metal in reducing the ferric oxide constituent to the ferrous state. Thus, the loss of metallic iron can be expressed by the following equation:

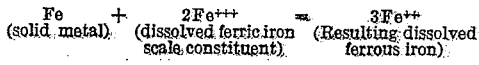

This equation shows that for each 2×55.84 pounds of ferric iron constituent dissolved from the scale there results a loss of 55.84 pounds of iron of the underlying metal.

While the foregoing organic nitrogen-base inhibitors exert a strong retarding effect on the rate of corrosion of the metal adjacent to the scale by hydrochloric acid in the absence of ferric iron constituents, they do not prevent the metallic iron from reducing the ferric iron constituents to ferrous iron with a corresponding solution or loss of the metallic iron bearing the scale.

It is the principal object of the invention to provide an improved inhibited acid composition and method of removing scale deposits containing a ferric iron constituent on a ferrous metal surface without significant attack upon the ferrous metal. Other objects and advantages will appear as the description of the invention proceeds.

The invention is predicated upon the discovery that, by including in the hydrochloric acid solution along with the foregoing organic nitrogen-base inhibitors a relatively small amount of phenyl hydrazine, the resulting acid solution is far less corrosive to ferrous metal in the presence of a ferric iron constituent than similar acid solutions containing as the sole inhibitor either the organic nitrogen-base or phenyl hydrazine.

In carrying out the invention, aqueous hydrochloric acid is used in a concentration suitable for decomposing, dissolving, or disintegrating the scale deposit to be removed from the iron or steel surface. In effecting removal of the scale, its complete solution is not always necessary. Some scale deposits contain both acid-soluble and acid-insoluble constituents and usually slough off when attacked by the acid without completely dissolving. As a consequence somewhat less acid generally need be used than that stoichiometrically equivalent to the acid-soluble matter of the scale. Various concentrations of the acid may be used, for example, concentrations in the range of about 5 to 25 per cent of HCl by weight are satisfactory. A generally useful concentration is about 10 or 15 per cent, although other concentrations may be used. Higher concentrations are generally less inhibitable than the lower concentrations, hence, it is preferable to employ the lower concentrations.

To the acid solution, I add an organic nitrogen-base inhibitor containing in the molecule a nitrogen ring, such as acridine, pyridine, the quinolines, and homologues thereof, e. g. methyl acridine, methyl quinoline, dimethyl quinoline, methyl isoquinoline, dimethyl isoquinoline, and the like, or mixtures thereof. The crude mixtures of coal tar bases may be used, such as the commercial coal tar base mixtures, particularly the fractions distilling in the range of about 238° to 270° C. as these are composed largely of organic nitrogen ring compounds, viz. the quinolines and their homologues. The amount to use may be about 0.1 to 2 per cent of the weight of the acid solution, 0.5 to 1 per cent being generally preferred.

In order to suppress the added corrosiveness acquired by the acid solution as it dissolves ferric iron from the scale, I add to the acid solution, in addition to the organic nitrogen-base acid corrosion inhibitor aforementioned, phenyl hydrazine (or the hydrochloride of phenyl hydrazine) which in combination with the acid-corrosion inhibitor greatly inhibits the ferric iron corrosion effect which normally occurs. Various amounts of phenyl hydrazine may be used depending upon the amount of ferric iron constituent to be dissolved by the acid in use. The amount used may be calculated from the stoichiometric equivalent of the ferric iron (one formula weight of phenyl hydrazine per equivalent of ferric iron) estimated to require solution in removing the scale, although other amounts may be used. The concentration of the phenyl hydrazine in the acid solution does not appear to be critical and may be, for example, from about 0.1 to 2 per cent of the weight of the solution.

To calculate the amount of ferric iron which will be converted to ferrous iron in a scale removal operation, one may resort to a conventional analyses of the scale to be removed which gives the amount of ferric iron in the scale. From such an analysis and a knowledge of the area of the ferrous metal surface covered by the scale, an estimate of the total weight of ferric ion-forming material that can be dissolved by the acid solution is computed on the assumption that during the acid treatment of the scale all the ferric iron forming constituents therein will be dissolved by the acid solution. The stoichiometric equivalent of phenyl hydrazine is ascertained from the foregoing calculated weight of the ferric ion-forming material in accordance with the stoichiometrical proportion to ferric iron already given. This amount or preferably 10 to 50 per cent in excess thereof of phenyl hydrazine is used in the acid solution.

Similar data as to the amount of acid-soluble material in the scale may be used to ascertain the quantity of acid solution needed, the amount used being preferably substantially in excess of actual needs. In some instances, in order to reach all the scale a larger volume may be needed as is usually the case in descaling boilers, tanks, and like vessels having a relatively large ratio of volume to scaled surface. In such cases, usually sufficient solution is used to fill the vessel even though the contained acid may greatly exceed that required to decompose the scale.

The following data are illustrative of the enhanced inhibiting action conferred by phenyl hydrazine upon hydrochloric solution containing the aforesaid organic nitrogen-base inhibitors. Into 300 gram samples of 10 per cent hydrochloric acid containing 0.25 per cent of commercial ring nitrogen-base inhibitor mixture of coal tar bases the mixture distilling in the range of 238°–270° C. were placed weighed mild steel test strips. The acid samples were maintained at various temperatures and the rates of weight loss of the strips were determined at the various temperatures used. For comparison, another set of similar tests was run in the presence of 1.35 per cent of added ferroso-ferric oxide ($Fe_3O_4$) to simulate a ferric iron scale constituent. These tests were made to show the increased rate of corrosion that obtains in the presence of a ferric iron constituent. And finally, another set of similar tests was run in which there was present in the inhibited acid bath 0.32 per cent phenyl hydrazine and 1.35 per cent of ferroso-ferric oxide. These data are tabulated below:

| Test Series | Composition of Acid Solution | Corrosion Rate in lbs. per sq. foot per day | | |
|---|---|---|---|---|
| | | 150° F. | 175° F. | 200° F. |
| 1 | 10% HCl+0.5% ring nitrogen-base inhibitor | 0.032 | 0.038 | 0.081 |
| 2 | Same as 1+1.35% $Fe_3O_4$ | 0.096 | 0.108 | 0.167 |
| 3 | Same as 2+0.32% phenyl hydrazine | 0.011 | 0.021 | 0.039 |

The foregoing data shows that while the corrosiveness of the inhibited acid solution is accelerated by the presence of a ferric iron constituent this effect is more than overcome by including in the inhibited acid solution a small proportion of phenyl hydrazine.

In another series of tests similar to the foregoing the effect of varying the concentrations of phenyl hydrazine was determined. In these tests 300 gram samples of 15 per cent hydrochloric acid were used to which was added 1.35 per cnt of $Fe_3O_4$, to provide a ferric ion-forming constituent, and 0.5 per cent of a commercial organic ring nitrogen-base acid corrosion inhibitor. This inhibited acid solution corroded mild steel test strips at the rate of 0.086 pound per square foot per day at 150° F., the strips being immersed in the acid for 16 hours. When phenyl hydrazine was also present in the acid solution in a concentration of 0.16 per cent, 0.32 per cent, and 0.64 per cent, the corrosion rate became 0.060, 0.033 and 0.019 pound per square foot per day respectively. In the absence of the organic ring nitrogen-base inhibitor, the corrosion rate of the 15 per cent acid solution with 1.3 per cent of phenyl hydrazine in the presence of 1.34 per cent $Fe_3O_4$ at 150° F. was 0.363 pound per square foot per day. The corrosion rate of the steel pieces in the uninhibited 15 per cent hydrochloric acid solution in the presence of 1.35 per cent of $Fe_3O_4$ was 1.56 pounds per square foot per day.

The principal advantage of the invention is that the added corrosiveness, acquired by hydrochloric acid inhibited by conventional organic ring nitrogen-base inhibitors when descaling ferrous metal in the presence of a ferric iron-forming constituent, is overcome by including in the acid solution a small amount of phenyl hydrazine along with the conventional organic ring nitrogen-base inhibitor.

I claim:

1. A composition for treating a ferrous metal surface comprising 5 to 25 per cent of HCl, 0.1 to 2 per cent of a water-soluble organic ring nitrogen-base selected from the group consisting of acridine, pyridine, quinolines and their homologues, and 0.1 to 2 per cent of phenyl hydrazine, the balance being water.

2. A composition for treating a ferrous metal surface comprising 5 to 25 per cent of HCl, 0.1 to 2 per cent of quinoline, and 0.1 to 2 per cent of phenyl hydrazine, the balance being water.

3. A composition for treating a ferrous metal surface comprising 5 to 25 per cent of HCl, 0.1 to 2 per cent of methyl quinoline, and 0.1 to 2 per cent of phenyl hydrazine, the balance being water.

4. A composition for treating a ferrous metal surface comprising 5 to 25 per cent of HCl, 0.1 to 2 per cent of pyridine, and 0.1 to 2 per cent of phenyl hydrazine, the balance being water.

HAROLD A. ROBINSON.

REFERENCES CITED

The following references are of record in the file of this patent:

UNITED STATES PATENTS

| Number | Name | Date |
| --- | --- | --- |
| 1,877,504 | Grebe et al. | Sept. 13, 1932 |
| 2,043,257 | Missbach | June 9, 1936 |
| 2,144,913 | Cole | Jan. 24, 1939 |